(12) United States Patent
Toki

(10) Patent No.: US 6,427,017 B1
(45) Date of Patent: Jul. 30, 2002

(54) PIEZOELECTRIC DIAPHRAGM AND PIEZOELECTRIC SPEAKER

(75) Inventor: Nozomi Toki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/439,347

(22) Filed: Nov. 15, 1999

(30) Foreign Application Priority Data

Nov. 13, 1998 (JP) ............................................. 10-338418

(51) Int. Cl.[7] ........................... H04R 25/00; H04R 1/02; H04R 17/00
(52) U.S. Cl. ........................ 381/190; 381/388; 381/333; 381/426; 181/170; 181/171
(58) Field of Search .................................. 381/333, 388, 381/184, 190, 398, 423, 426; 181/170–172

(56) References Cited

U.S. PATENT DOCUMENTS

| 4,352,961 A | * | 10/1982 | Kumada |
| 4,974,942 A | * | 12/1990 | Gross |
| 5,115,472 A | | 5/1992 | Park et al. |
| 5,309,519 A | * | 5/1994 | Park |
| 5,400,414 A | * | 3/1995 | Thiele |
| 6,130,952 A | * | 10/2000 | Akino |
| 6,185,809 B1 | * | 2/2001 | Pavlovic |

FOREIGN PATENT DOCUMENTS

| EP | 0 599 250 | 6/1994 |
| GB | 2 052 919 | 1/1981 |
| GB | 1597615 | 9/1981 |
| JP | 56152399 | 11/1981 |
| JP | 334391 | 4/1991 |
| JP | 4-70100 | 3/1992 |
| JP | 4105796 | 9/1992 |

* cited by examiner

Primary Examiner—Curtis Kuntz
Assistant Examiner—Dionne Harvey
(74) Attorney, Agent, or Firm—Young & Thompson

(57) ABSTRACT

Disclosed is a piezoelectric diaphragm with a transparent piezoelectric member and a transparent electrode. Also disclosed is a portable electronic device that has a display means to display an image and a piezoelectric speaker having a transparent piezoelectric member and a transparent electrode. In this portable electronic device, the piezoelectric speaker is disposed in front of the display means.

2 Claims, 5 Drawing Sheets

FIG.4
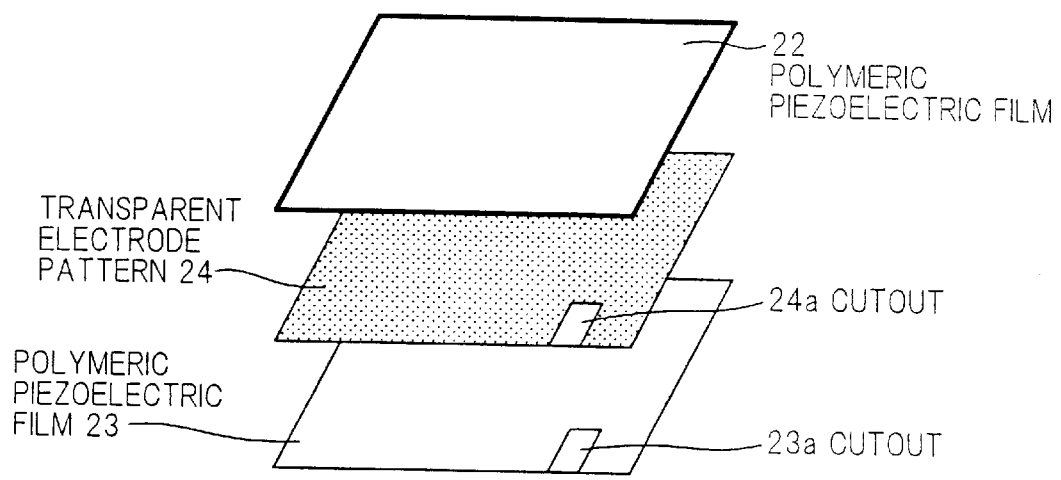
22 POLYMERIC PIEZOELECTRIC FILM
TRANSPARENT ELECTRODE PATTERN 24
24a CUTOUT
POLYMERIC PIEZOELECTRIC FILM 23
23a CUTOUT
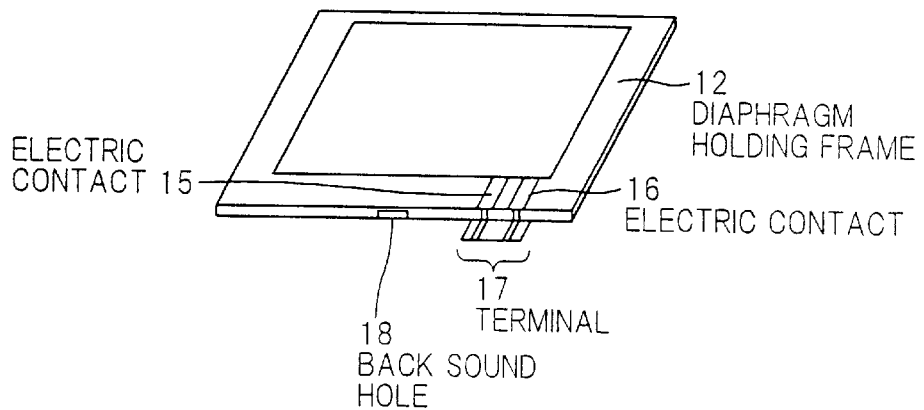
12 DIAPHRAGM HOLDING FRAME
ELECTRIC CONTACT 15
16 ELECTRIC CONTACT
17 TERMINAL
18 BACK SOUND HOLE

PIEZOELECTRIC DIAPHRAGM AND PIEZOELECTRIC SPEAKER

FIELD OF THE INVENTION

This invention relates to a piezoelectric diaphragm and a piezoelectric speaker to be used for a portable electronic device, such as a mobile communication terminal.

BACKGROUND OF THE INVENTION

Conventionally, receivers or speakers used in portable electronic devices are typically of dynamic type or piezoelectric type. In recent years, especially for mobile telephone terminals, a large-area LCD (liquid crystal display) to display information such as image etc. has been desired increasingly.

With such enlargement of LCD area, a reduction in the area of a diaphragm for a receiver or speaker has been required. However, if the area of diaphragm is reduced to give a large-area LCD, the efficiency of electrical-acoustical conversion reduces and therefore the sound pressure reduces.

Japanese patent application laid-open No.4-70100 (1992) discloses a piezoelectric transparent speaker that can be made lighter and thinner than a dynamic type speaker and is provided with a transparent diaphragm, which can expand the range of use.

However, in case of a bimorph that piezoelectric ceramic for piezoelectric speaker is attached to both sides of a metallic diaphragm, the manufacturing cost increases since lead wires for electrode need to be led out from the two sides.

Also, in case of the transparent piezoelectric diaphragm that is attached to the front face of a display device such as a LCD etc, the manufacturing cost increases since lead wires for electrode also have to be formed with transparent conductive material.

SUMMARY OF THE INVENTION

Accordingly, it is an object of the invention to provide a piezoelectric diaphragm and a piezoelectric speaker that can lend a large installation area to a display device, such as LCD and CRT display, in a portable electronic device.

It is a further object of the invention to provide a portable electronic device that is equipped with a speaker and a display that can have a large installation area commonly.

According to the invention, a piezoelectric diaphragm, comprises:
   a transparent piezoelectric member and a transparent electrode.

According to another aspect of the invention, a piezoelectric diaphragm, comprises:
   a first transparent piezoelectric film;
   a transparent electrode; and
   a second transparent piezoelectric film;
   wherein the piezoelectric diaphragm has a lamination structure in which the first transparent piezoelectric film, the transparent electrode and the second transparent piezoelectric film are laminated.

According to another aspect of the invention, a piezoelectric speaker, comprises:
   a piezoelectric diaphragm which is composed of a transparent piezoelectric member and a transparent electrode;
   a first frame which holds the fringe of the piezoelectric diaphragm on the side of transparent electrode; and
   a second frame which holds the fringe of the piezoelectric diaphragm on the side of transparent piezoelectric member;
   wherein the first and second frames are installed so that an image to be displayed by a display means is seen through transparent parts inside the first and second frames.

According to another aspect of the invention, a piezoelectric speaker, comprises:
   a piezoelectric diaphragm which has a lamination structure in which a first transparent piezoelectric film, a transparent electrode and a second transparent piezoelectric film;
   a first frame which holds the fringe of the piezoelectric diaphragm on the side of the first transparent piezoelectric film of the piezoelectric diaphragm; and
   a second frame which holds the fringe of the piezoelectric diaphragm on the side of the second transparent piezoelectric film of the piezoelectric diaphragm;
   wherein the first and second frames are installed so that an image to be displayed by a display means is seen through transparent parts inside the first and second frames.

According to another aspect of the invention, a portable electronic device, comprises:
   a display means to display an image; and
   a piezoelectric speaker composed of a transparent piezoelectric member and a transparent electrode;
   wherein the piezoelectric speaker is disposed in front of the display means.

BRIEF DESCRIPTION OF THE DRAWINGS

The invention will be explained in more detail in conjunction with the appended drawings, wherein:

FIG. 4 is a broken perspective view showing the detailed composition of a piezoelectric diaphragm in a second preferred embodiment according to the invention.

DESCRIPTION OF THE PREFERRED EMBODIMENTS

A. First Embodiment

Figure 1:
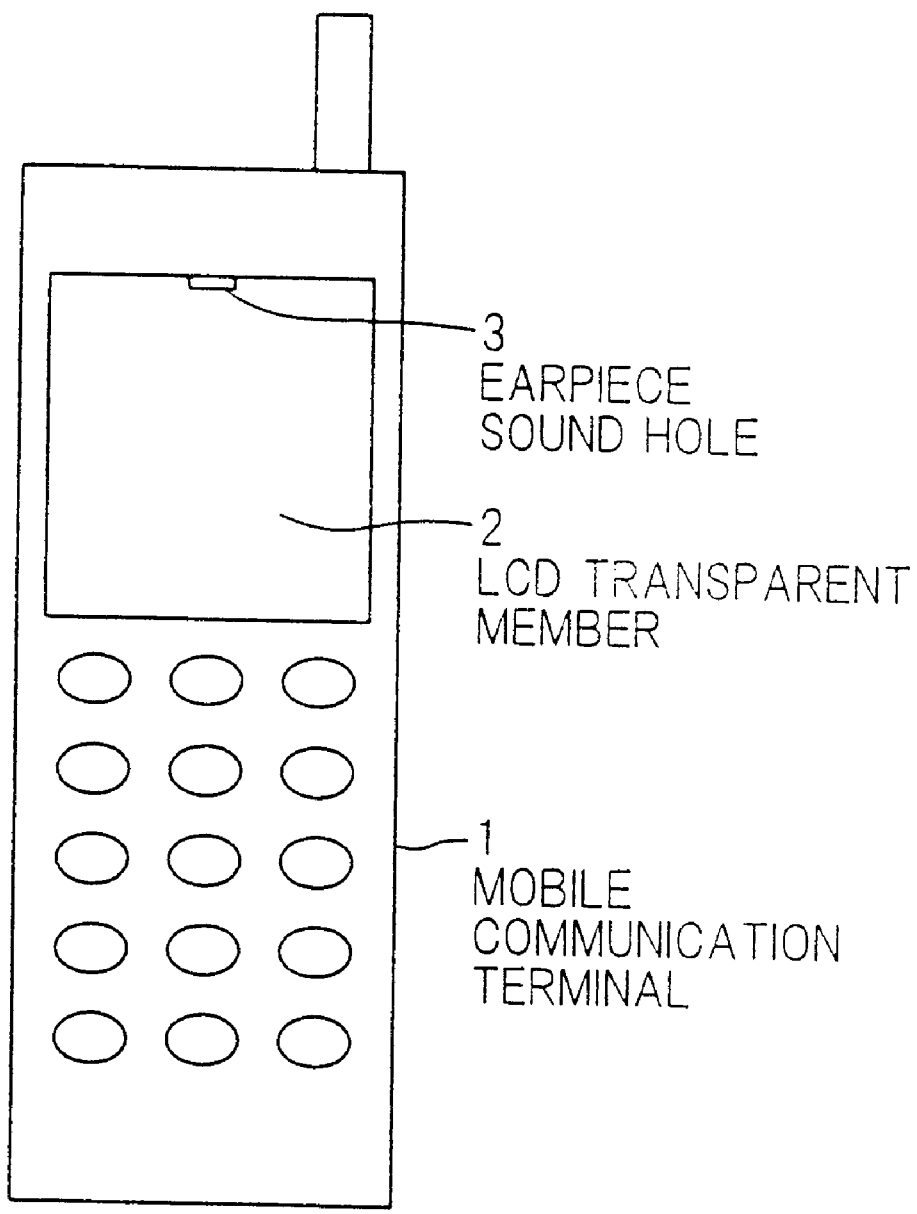
FIG. 1 is a front view showing a portable electronic device in which a piezoelectric speaker in a first preferred embodiment according to the invention is installed.

A first preferred embodiment of the invention is explained below, referring to FIG. 1. FIG. 1 is a front view showing a portable electronic device to which a piezoelectric speaker according to the invention is applied. This portable electronic device is a mobile communication terminal such as a portable telephone etc. In the mobile communication terminal 1, a piezoelectric polymer acoustic transducer is installed.

2 on the front surface of the mobile communication terminal 1 is a LCD transparent member that is provided with an earpiece sound hole 3.

A piezoelectric transparent speaker unit 26, which is described later, is disposed behind the LCD transparent member 2, and emits sound from the earpiece sound hole 3.

Figure 2:
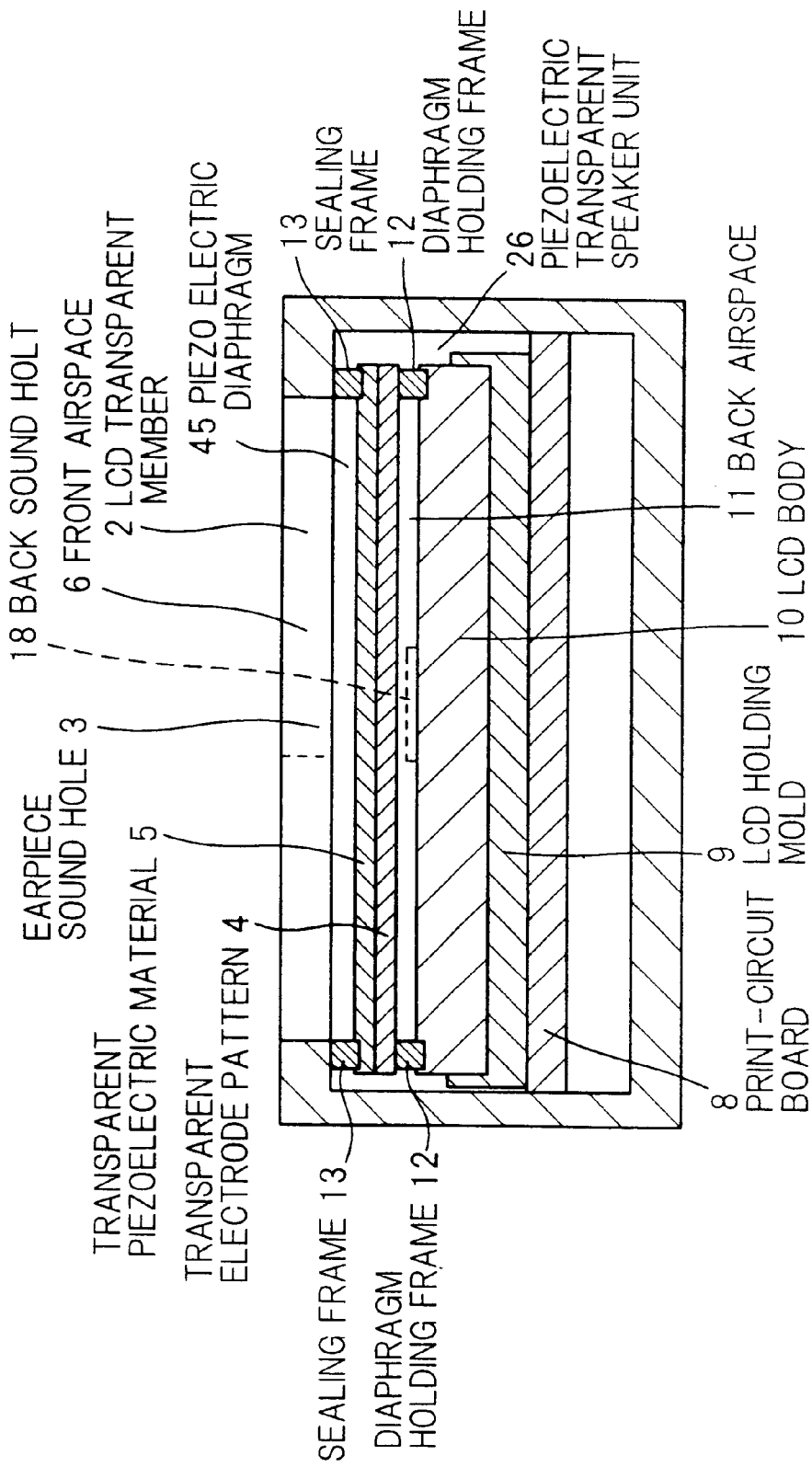
FIG. 2 is a cross sectional view showing the detailed composition of a piezoelectric transparent speaker unit 26 in the mobile communication terminal 1 in FIG. 1.
Figure 3:
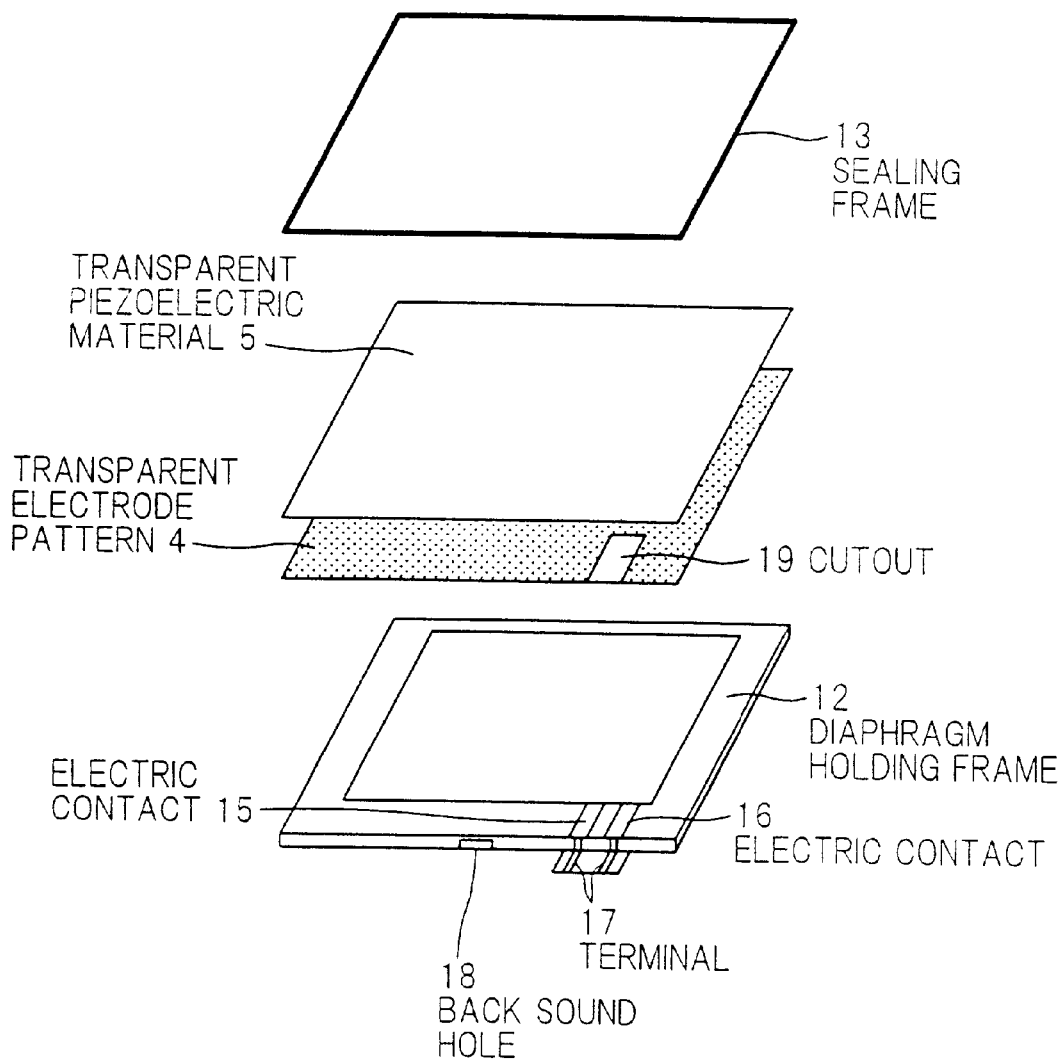
FIG. 3 is a broken perspective view showing the piezoelectric transparent speaker unit 26 in FIG. 2.

FIG. 2 is a cross sectional view showing the detailed composition of the piezoelectric transparent speaker unit 26 built in the above mobile communication terminal 1. Also, FIG. 3 is a broken perspective view showing the piezoelectric transparent speaker unit 26.

Inside the mobile communication terminal 1, a LCD body (display means) 10 is fixed onto a print-circuit board 8 through a LCD holding mold 9.

A piezoelectric diaphragm 45 that is composed of a transparent electrode pattern (transparent electrode) 4 and a transparent piezoelectric material (transparent piezoelectric member) 5 is fixed onto (the front face of) the LCD body 10 through a diaphragm holding frame (first frame) 12, and is fixed facing to the LCD transparent member 2 of the mobile communication terminal 1 through a sealing frame (second frame) 13.

Thus, a back airspace 11 sealed by the diaphragm holding frame 12 is formed on the back side of the piezoelectric diaphragm 45, and a front airspace 6 sealed by the sealing frame 13 is formed on the front side of the piezoelectric diaphragm 45.

A back sound hole 18 is a hole to control the internal pressure of the back airspace 11, and is formed between a groove formed on the diaphragm holding frame 12 and the LCD body 10 when the diaphragm holding frame 12 and the LCD body 10 contact each other.

The transparent electrode pattern 4 is formed on the transparent piezoelectric material 5, and an electric contact 15 is connected to the transparent electrode pattern 4. Also, an electric contact 16 is formed corresponding to the position of a cutout 19, thereby connected to the transparent piezoelectric material 5.

Meanwhile, a terminal 17 is provided to lead out the electric contacts 15 and 16 to the outside.

Voltage applied to the terminal 17 is fed to the transparent electrode pattern 4 or the transparent piezoelectric material 5 through the electric contact 15 or 16, thereby a voltage difference occurs between the transparent electrode pattern 4 and the transparent piezoelectric material 5.

Hereupon, by the bending movement of the piezoelectric diaphragm 45 composed of the transparent electrode pattern 4 and the transparent piezoelectric material 5, sound waves are emitted from the earpiece sound hole 3.

As the transparent piezoelectric material 5 in FIGS. 2 and 3, for example, transparent piezoelectric ceramic or polymeric piezoelectric film is used. The transparent electrode pattern 4 is of transparent conductive film such as ITO etc.

When using polymeric piezoelectric film as the transparent piezoelectric material 5, it is easier thinned than piezoelectric ceramic and has a density lower than piezoelectric ceramic. Therefore, polymeric piezoelectric film is a material suitable for weight saving and thinning.

Also, polymeric piezoelectric film does not have mechanical brittleness as exhibited in ceramics, and therefore it has a more suitable diaphragm characteristic than ceramics.

In using transparent piezoelectric ceramic or polymeric piezoelectric film as the transparent piezoelectric material 5, at first, transparent conductive thin film such as ITO etc. is formed thereon by vacuum deposition or sputtering, and then the transparent electrode pattern 4 is formed by photo etching etc.

B. Second Embodiment

FIG. 4 is a broken perspective view showing the detailed composition of a piezoelectric diaphragm in a second preferred embodiment according to the invention. In FIG. 4, like parts are indicated using like numerals in FIGS. 2 and 3, and their explanations are omitted herein.

In the second embodiment shown in FIG. 4, a transparent electrode pattern 24 is sandwiched between polymeric piezoelectric film 22 and polymeric piezoelectric film 23, thereby a bimorph-type piezoelectric diaphragm is configured.

In this embodiment, at first, the transparent electrode pattern 24 is formed on the polymeric piezoelectric film 22, and then, on the back side, the polymeric piezoelectric film 23 is attached. Thereby, a bimorph piezoelectric diaphragm can be formed easily.

On the transparent pattern electrode 24, a cutout 24a is formed by photo etching etc. Also, on corresponding part of the polymeric piezoelectric film 23, a cutout 23a is formed.

By pasting these polymeric piezoelectric films 22 and 23 together, the two films is contacted.

By pasting this bimorph piezoelectric film onto the diaphragm holding frame 12, the electric contact 15 is contacted with the polymeric piezoelectric film 22 and the electric contact 16 is contacted with the transparent electrode pattern 24 through the output 23a and the output 24a.

In this embodiment, the electric contact 15 is an electrode terminal for the polymeric piezoelectric films 22, 23, and the electric contact 16 is an electrode terminal for the transparent electrode pattern 24.

As described above, in this embodiment, the piezoelectric diaphragm is composed of the polymeric piezoelectric films and the transparent electrode. Thus, the electrode is connected to the piezoelectric film opposite to the electrode terminal. Therefore, a bimorph piezoelectric diaphragm and electrode can be produced in large quantities.

Meanwhile, in the second embodiment, at first, transparent conductive film such as ITO etc. is formed on the polymeric piezoelectric film 22 by vacuum deposition or sputtering. Then, the transparent electrode pattern 24 is formed by photo etching.

Then, the polymeric piezoelectric film 23 is pasted onto the transparent-electrode side of the polymeric piezoelectric film 22, thereby the bimorph-type piezoelectric diaphragm is formed.

Further, by adhering this piezoelectric diaphragm to the LCD holding mold 9 (see FIG. 2), a bimorph-type piezoelectric transparent speaker is formed.

When the piezoelectric transparent speaker thus formed is installed between the LCD transparent member 2 and the LCD body 10, it operates as a speaker.

Figure 5:
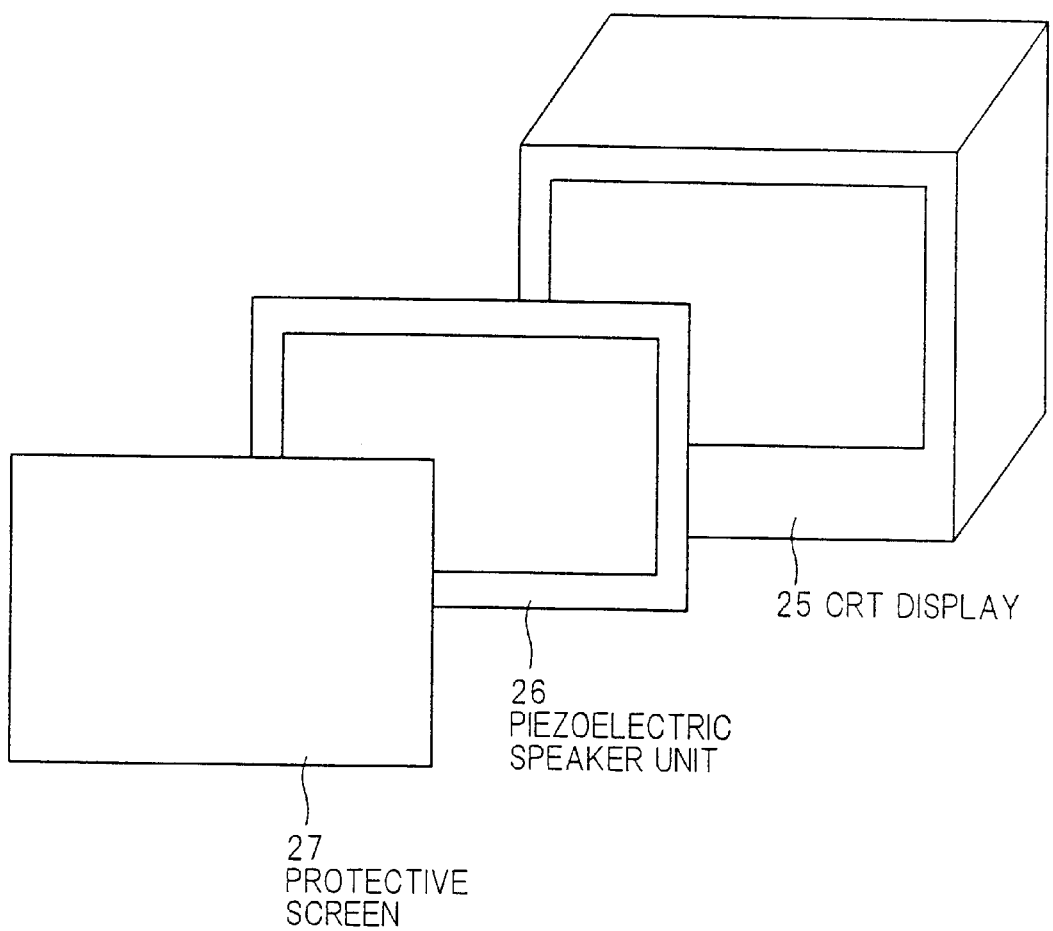
FIG. 5 is an illustration showing an application of this invention.

FIG. 5 is an illustration showing an application of the invention, and is a broken perspective view showing the installation.

In the application in FIG. 5, the piezoelectric transparent speaker unit 26 described above is installed on the front side of a CRT display 25, which is used as a television set etc. Further, for the purpose of protecting the piezoelectric diaphragm, a protective screen 27 that is of a transparent material is installed on the front side of the piezoelectric transparent speaker.

By thus installing the piezoelectric transparent speaker on the front side of a large-size display device such as a Braun tube or CRT (cathode-ray tube) display, the image can correspond to the sound source.

Other than this, this invention can be applied to the front side of any display device such as a plasma display, projector-type display etc.

Advantages of the Invention

According to the invention, the transparent speaker is composed of the transparent piezoelectric diaphragm formed with a transparent piezoelectric material and a transparent electrode pattern by using vacuum etching or photo etching, and the frame to hold the fringe of this piezoelectric diaphragm. Also, such transparent piezoelectric diaphragm can be attached onto the front side of a LCD plate. Thereby, it can function as a speaker without blocking the displaying of LCD. Especially in portable communication terminals, the installation onto the space for LCD can prevent the installation area for speaker from increasing. Therefore, the portable communication terminals can be miniaturized and lightened by that much. Further, with a large area of diaphragm, high electrical-acoustical conversion efficiency and a high productivity, a piezoelectric diaphragm and a piezoelectric speaker can be provided.

In detail, the invention has advantages below.

By installing the speaker between the LCD body and the display screen, the installation area for speaker can be prevented from increasing. Further, the number of components for speaker can be reduced by using some components for LCD commonly. Thus, with a built-in LCD, a speaker for portable device can be miniaturized and lightened.

Also, since the display area of LCD is used commonly as the area of diaphragm, the area of diaphragm can be larger than that in the conventional speaker installed into small-size portable devices, and the electrical-acoustical conversion efficiency can be therefore enhanced. Further, since it is of piezoelectric type, its consumed power can be lowered comparing with the conventional dynamic-type speaker.

Since the image of LCD corresponds to the sound source of transparent piezoelectric speaker, it can lend natural communication and vision to a monitor for TV phone, TV set or VTR.

When using polymeric piezoelectric film, the transparent electrode pattern with the piezoelectric films on both sides can be mass-produced by vacuum deposition, photo etching. Thus, the bimorph piezoelectric diaphragm can be manufactured at a low cost.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A piezoelectric speaker, comprising:
   a piezoelectric diaphragm which is composed of a transparent piezoelectric member and a transparent electrode;
   a first frame which holds the fringe of said piezoelectric diaphragm on the side of transparent electrode; and
   a second frame which holds the fringe of said piezoelectric diaphragm on the side of transparent piezoelectric member;
   wherein said first and second frames are installed so that an image to be displayed by a display means is seen through transparent parts inside said first and second frames;
   wherein said transparent piezoelectric member and said transparent electrode composing said piezoelectric diaphragm each are patterned with a transparent pattern; and a terminal disposed on said first frame is provided with a first electrode electrically connected to said transparent electrode and a second electrode electrically connected to the transparent piezoelectric member; and
   wherein said transparent piezoelectric member and said transparent electrode have the same external dimensions except for a cutout provided along a portion of an edge of said transparent electrode, said cutout corresponding to said second electrode; and
   said second electrode is electrically connected to said transparent piezoelectric member through said cutout when said first frame is contacted with said piezoelectric diaphragm.

2. A piezoelectric speaker, comprising:
   a piezoelectric diaphragm which has a lamination structure in which a first transparent piezoelectric film, a transparent electrode and a second transparent piezoelectric film;
   a first frame which holds the fringe of said piezoelectric diaphragm on the side of said first transparent piezoelectric film of said piezoelectric diaphragm; and
   a second frame which holds the fringe of said piezoelectric diaphragm on the side of said second transparent piezoelectric film of said piezoelectric diaphragm;
   wherein said first and second frames are installed so that an image to be displayed by a display means is seen through transparent parts inside said first and second frames;
   wherein said first and second transparent piezoelectric films composing said piezoelectric diaphragm each are patterned with a transparent pattern; and a terminal disposed on said first frame is provided with a first electrode electrically connected to said transparent electrode and a second electrode electrically connected to the transparent piezoelectric member; and
   wherein said first transparent piezoelectric film, said second transparent piezoelectric film, and said transparent electrode have the same external dimensions except for a first cutout provided along a portion of an edge of each of said first transparent piezoelectric film and a second cutout provided along an edge of said transparent electrode, each of the first and second cutout corresponding to the position of said second electrode; and
   said second electrode is electrically connected to said transparent piezoelectric member through said first and second cutouts when said first frame is contacted with said piezoelectric diaphragm.

* * * * *